Patented June 6, 1950

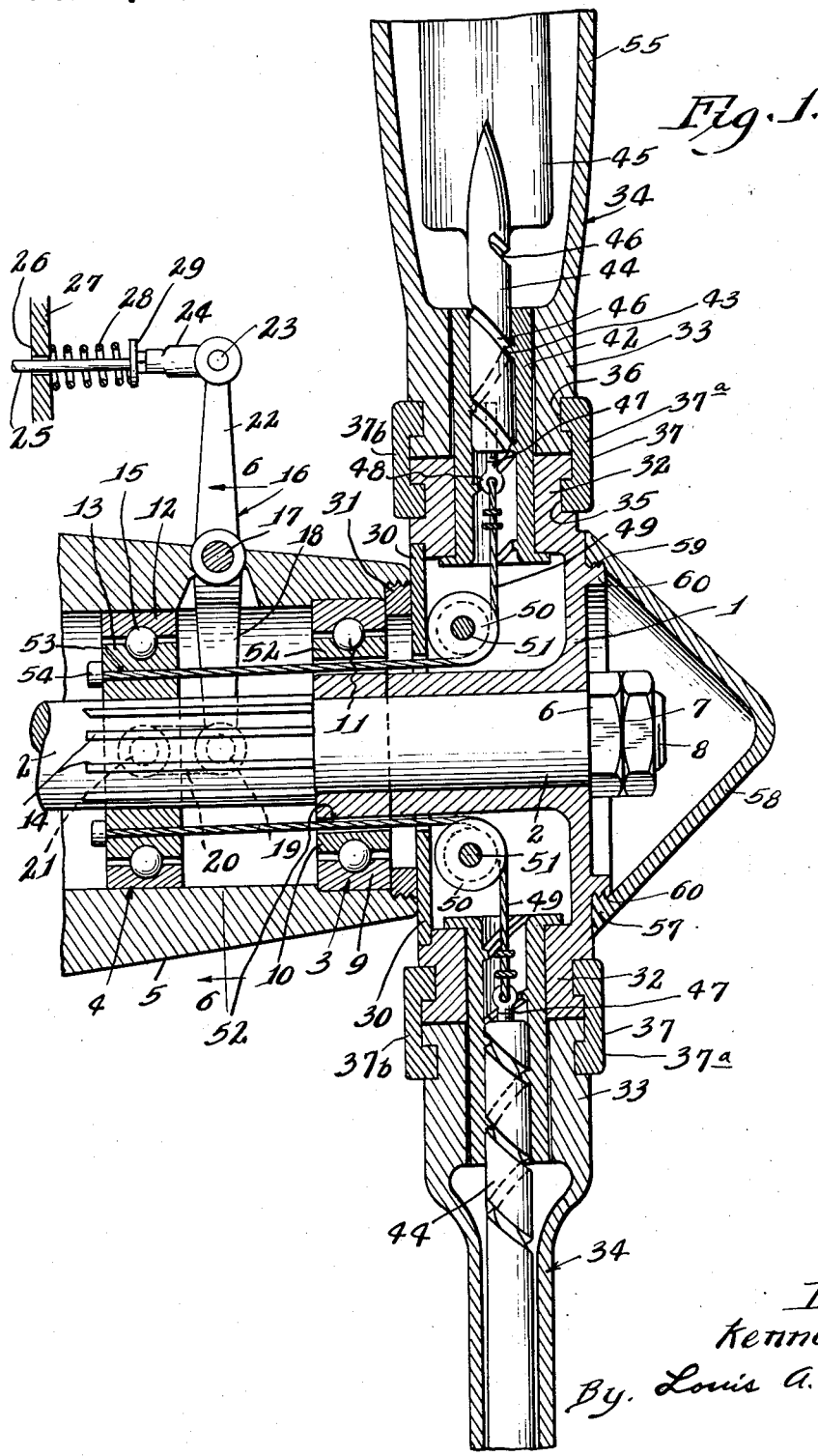

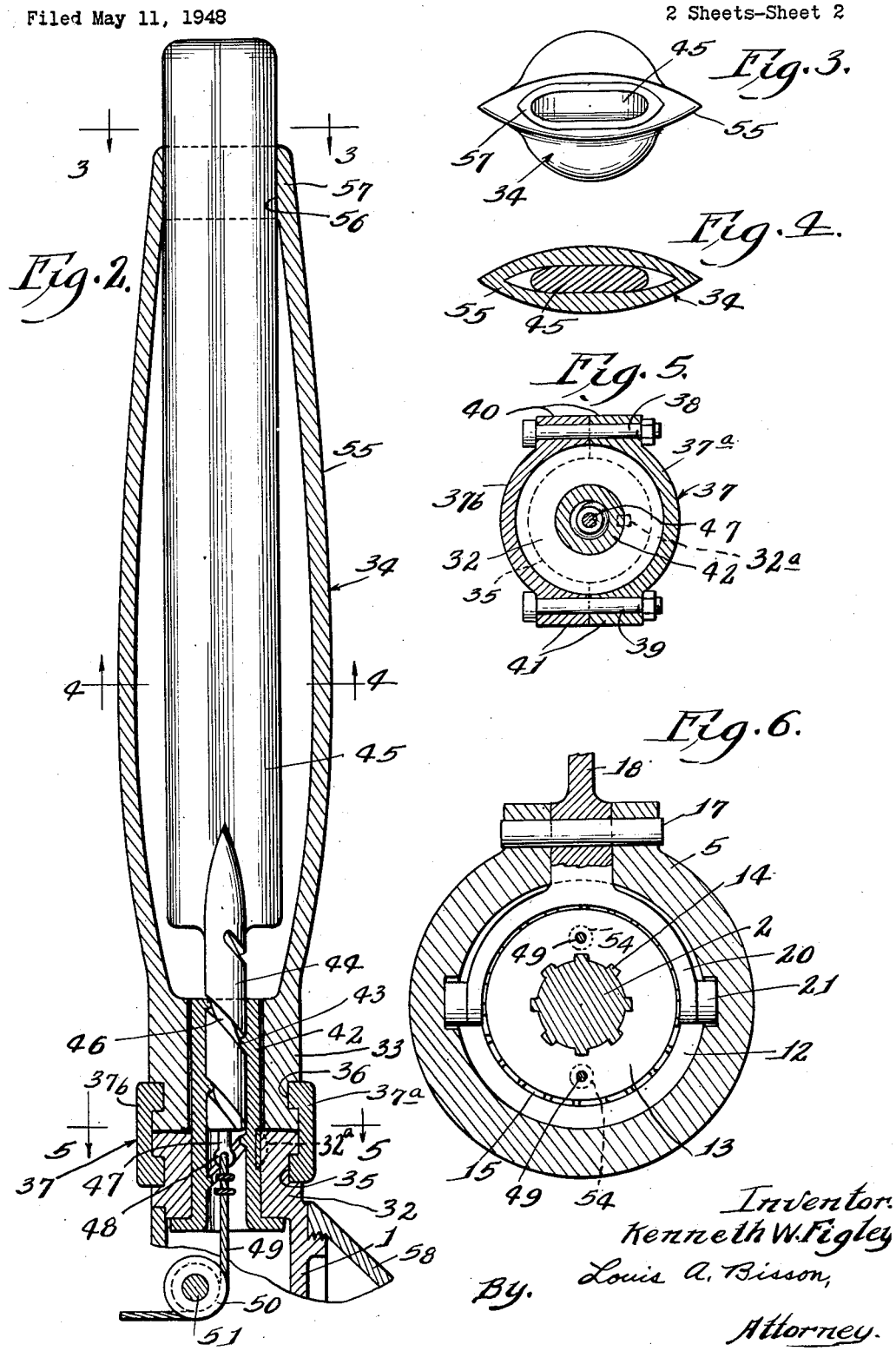

2,510,216

UNITED STATES PATENT OFFICE 2,510,216

AIRCRAFT PROPELLER

Kenneth W. Figley, Wheatland, Iowa

Application May 11, 1948, Serial No. 26,355

5 Claims. (Cl. 170—160.11)

The present invention relates to aircraft or like propellers and more particularly to variable blades therefor.

Among the objects of the invention is to provide a novel propeller blade means which is variable at will in its surface of reaction with the air for different operative effects consonant with the locus of the aircraft for effecting an efficient, effective and safe propulsion of the craft.

A further object of the invention is to provide a novel propeller blade means having extensible parts for offering varied engagement with the air at certain stages of propulsion of the craft.

Another object of the invention is to provide a novel means of mounting of the propeller blade means and a novel means for varying the blade means, as to surface engagement with the air and as to the pitch thereof, for different purposes of propulsion.

Other objects, capabilities, advantages, features and the like are comprehended by the invention as will later appear, and as are inherently possessed by the invention.

Referring briefly to the drawings:

Fig. 1 is a sectional view of a propeller structure constructed in accordance with the invention;

Fig. 2 is a sectional view of the blade structure of the device;

Fig. 3 is a transverse sectional view taken in a plane represented by line 3—3 in Fig. 2 of the drawings;

Fig. 4 is a transverse sectional view taken in a plane represented by line 4—4 in Fig. 2 of the drawings;

Fig. 5 is a transverse sectional view taken in a plane represented by line 5—5 in Fig. 2 of the drawings; and, Fig. 6 is a transverse sectional view taken in a plane represented by line 6—6 in Fig. 1 of the drawings.

Referring more in detail to the drawings, the embodiment chosen to illustrate the invention is shown as comprising a propeller rotor or hub 1 suitably fixed to a shaft 2 rotatably supported in bearing means 3 and 4 carried in a housing part 5 of the craft. The shaft 2 is fixed to the hub 1 by suitable securing means, such as nuts 6 and 7 on the threaded end 8 of the shaft 2. The bearings 3 and 4 may be of the ball or roller type wherein the bearing 3 has an outer ring 9 fixed to the housing 5, an inner ring 10 fixed to the shaft 2 and a race of balls or rollers 11 therebetween; and wherein the bearing 4 has an outer ring 12 slidable in the housing 5, an inner ring 13 slidably engaged with the shaft 2 by way of spline means 14 on the shaft 2, and a race of balls or rollers 15, the bearing means 4, as a whole, being slidable along the spline means 14 by a manually operated control lever 16 which is fulcrumed to the housing 5 by way of a fulcrum 17 and having an arm or fork 18 pivoted by way of pivot means 19 with link means 20 in turn pivoted by way of pivot means 21 on the outer ring 12, and the lever 16 having an arm 22 pivotally connected by way of a pivot means 23 to a link means 24 fixed to a sliding rod 25 slidable through an opening 26 provided in a wall 27 of the craft, and with a spring 28 around the rod 25 and reacting between the wall 27 and a cap 29 on the link 24.

The inner end of the hub 1 has a thrust bearing plate or the like 30 in thrust with a thrust ring 31 fixed to the end of the housing 5. See Fig. 1.

The hub 1 has radially extending necks or the like 32 with which rotatably abut the shanks 33 of the blades of the propeller. Both the neck 32 and the shank 33 have annular channels 35 and 36 in which fits a collar 37 having collar halves 37a and 37b (see Fig. 5) the halves being held together by bolts 38 and 39 extending through ears 40 and 41 of the collar halves 37a and 37b.

Extending through the neck portion 32 and the shank 33 is a guide sleeve 42 which is fixed at its inner end to the neck 32 but with which the shank 33 may turn about the axis of the sleeve 42. In the sleeve 42 is provided a helical ridge or spline 43 and slidable in said sleeve 42 is a stem 44 of an auxiliary propeller blade 45, the stem 44 having a helical groove or channel 46 cooperating with the ridge or spline 43 so that when the stem 44 is moved longitudinally, it is also given a rotating movement about its axis.

At the inner end of the stem 44 is fixed a stud 47 having an eye 48 to which is connected an end of a flexible tension element 49 as a rope, chain or the like, this element 49 passing over a pulley 50 or the like rotatable on a pivot 51 fixed to the hub or rotor 1, and then passing through a hole 52 provided in the bearing ring 10 and also extending to the bearing ring 13 as through a hole 53 in the ring 13 and attached by suitable anchor means 54 at the ends of the element 49 and at and to the side of the ring 13. See Figs. 1 and 6.

The blade means 34 has a main blade portion 55 which is generally hollow but which has at its outer end a head 57 provided with a longitudinal channel 56 in which the auxiliary blade 45 fits and is slidable, the blade parts 45 and 55, and the channel 56 being elliptical in cross section as shown in Figs. 3 and 4.

At the forward end of the hub 1 is provided a stream-lined cap 58 suitably secured in place as by threaded parts 59 and 60.

In operation, when the craft is on the ground or taking off and the propeller is rotating to lift the craft, the lever 16 is shifted so that the bearing means 4 slides along the splined part 14 of the shaft 2 and hence lets the stem 44 and the auxiliary blade 45 move by centrifugal force and hence the blade assembly 34 is lengthened or elongated to give greater traction or pulling power on the air, the grooved part 46 of the stem 44 so cooperating with the spline or key 43 as to cause the blade 45 to turn about its axis and also coordinate therewith a like turning of the blade part 55, or, in other words, the whole blade assembly 34 turns as well as elongates. After the craft is in the air and has gained the necessary speed for normal navigation, the lever 16 is forced out and the bearing means 4 slid back and the blade 45 drawn in so, in effect, the blade assembly 34 is shortened to its normal length. When about to land and to have a safe control, the lever 16 may be again shifted to let the auxiliary blade 45 out to effect a lengthening of the blade assembly 34.

While I have herein described and upon the drawings shown an embodiment of the invention, it is to be understood that it is by way of illustratration, and that the invention comprehends other constructions, details, arrangements of parts, features, and the like without departing from the spirit of the invention.

Having thus disclosed the invention, I claim:

1. An aircraft propeller means of the character described comprising a rotatable hub; a propeller blade assembly mounted on said hub and comprising an outer, main blade portion and an auxiliary blade portion slidably but non-rotatably mounted within said main blade portion, the outer end of said auxiliary blade portion being extensible beyond the outer end of said main blade portion to increase the effective diameter of said propeller assembly; a shank on the inner end of said main blade portion rotatably mounted on said hub to permit pitch change movements of said main blade portion; a stem on the inner end of said auxiliary blade portion and slidable axially of and rotatable in said hub; means for effecting relative axial movement of said auxiliary blade portion and of the stem thereof with respect to said hub; and means interconnecting said stem and hub for simultaneously effecting pitch change movements of said auxiliary and main blade portions upon axial movement of said auxiliary blade portion and its stem with respect to said hub.

2. An aircraft propeller means as defined in claim 1, wherein the main blade portion has an axial bore extending from said shank to the outer end of said main blade portion, which bore has a non-circular transverse cross section throughout at least a portion of its length, and wherein the auxiliary blade portion for at least a portion of its length has a substantially corresponding non-circular transverse cross section cooperating with said non-circular transverse cross section of the bore, whereby said auxiliary blade is slidably but non-rotatably mounted within said outer main blade portion so that rotation of said auxiliary blade about its axis will effect corresponding and simultaneous rotation of said main outer blade about its axis.

3. An aircraft propeller means as defined in claim 1, wherein the inner end of the shank of said main blade portion abuts the outer end of the rotatable hub with said shank and hub in axial alinement, and wherein a split collar is clamped about said abutting ends, said collar having spaced, inwardly directed flanges which engage within annular channels formed adjacent the abutting ends of said shank and hub, respectively.

4. An aircraft propeller means as defined in claim 1, wherein the hub has fixed thereto an axially projecting sleeve about which the shank of said main blade portion is rotatable during pitch change movements of said main blade portion, with the stem of the auxiliary blade portion rotatably and axially movable within said sleeve, and wherein the means interconnecting said stem and hub for simultaneously effecting pitch change movements of said auxiliary and main blade portions upon axial movement of said auxiliary blade portion and its stem with respect to the hub is disposed between the inner surface of said sleeve and the outer surface of said stem.

5. An aircraft propeller means as defined in claim 1, wherein the means for effecting relative axial movement of said auxiliary blade portion and the stem thereof with respect to the hub comprises a member attached to the inner end of the stem which, when released for radial outward movement permits the auxiliary blade portion and stem to move radially outward under the action of centrifugal force as the hub and propeller assembly are rotated to project the outer end of said auxiliary blade portion outwardly beyond the outer end of the main blade portion and simultaneously effect pitch change movements of said auxiliary and main blade portions, and which member when retracted retracts the outer end of said auxiliary blade portion inwardly with respect to the outer end of the main blade portion and simultaneously effects pitch change movements of said auxiliary and main blade portion.

KENNETH W. FIGLEY.

REFERENCES CITED

The following references are of record in the file of this patent:

UNITED STATES PATENTS

| Number | Name | Date |
|---|---|---|
| 1,922,866 | Rosenberg | Aug. 16, 1933 |
| 2,145,413 | Belfield | Jan. 31, 1939 |
| 2,173,291 | Ash | Sept. 19, 1939 |
| 2,380,540 | Mollenhauer | July 31, 1945 |
| 2,403,946 | Noyes | July 16, 1946 |

FOREIGN PATENTS

| Number | Country | Date |
|---|---|---|
| 325,296 | Germany | Sept. 11, 1920 |
| 854,818 | France | Jan. 29, 1940 |